Figure 1:
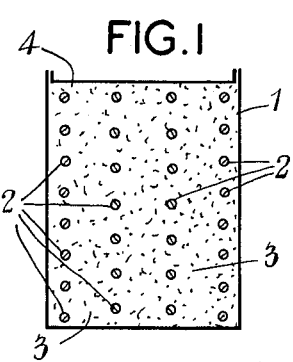

March 2, 1965     A. S. DARLING     3,171,195

PRODUCTION OF COMPOSITE METAL STRIP

Filed June 11, 1962     3 Sheets-Sheet 1

March 2, 1965  A. S. DARLING  3,171,195
PRODUCTION OF COMPOSITE METAL STRIP
Filed June 11, 1962  3 Sheets-Sheet 3

3,171,195
PRODUCTION OF COMPOSITE METAL STRIP
Alan Sydney Darling, Northwood, England, assignor to Johnson, Matthey & Company Limited, London, England, a British company
Filed June 11, 1962, Ser. No. 201,483
5 Claims. (Cl. 29—420.5)

This invention relates to improvements in and relating to the production of composite metal strip or other section, and more particularly to decorative metal for use in the manufacture of articles of feminine adornment, such as bracelets, bangles, ear-rings and the like, or of compact cases or cigarette cases.

Decorative metal having regular or random or mosaic-like pattern effects on one face thereof is already known for use in the manufacture of jewellery articles, such as bangles.

Various methods may be employed for the manufacture of decorative metal. For example, a regular or irregular patterned effect may be produced by enamelling the surface of the metal with enamel of a different colour or colours from that of the metal base.

A more satisfactory, but more expensive, method is to etch a metal surface, preferably according to a required pattern or design and to fill in the etched portion or portions with a metal or metals of a different colour or colours from that of the metal base to form an inlay metal piece in which the pattern or other decoration lies flush with the surface of the base.

A further method consists in preparing a strip composed of two or more superposed metallic layers of differently coloured metals or alloys intimately bonded to one another by a hot rolling technique and producing therein a mosaic or patterned effect by etching the surface of the strip to varying depths to lay bare or expose the underlying layer or layers according to a predetermined pattern.

Each of the above methods, however, suffers from certain inherent disadvantages which renders it unsuitable or unsatisfactory for the economical production of popular-priced jewellery articles.

The enamelling method, whilst being satisfactory where only a relatively small number of articles is to be produced, is time-consuming and, therefore, uneconomical for the mass production of cheap jewellery. Moreover, the enamelled pattern is liable to wear off in use or to become separated from the metal base during fabrication of articles from such decoratve metal.

The insert method, and that involving the use of pre-fabricated bi-metallic or multi-layered metallic strip, is relatively expensive and is liable to be unsatisfactory owing to the difficulty of ensuring an adequate metallurgical bond between the component metals such as will allow of extensive working of the composite metal.

The principal object of this invention is to provide a novel and efficient method of making a composite decorative metal, which is not subject to the above disadvantages.

Another object is to provide a method of making a composite regularly or irregularly patterned decorative metal which is simple and cheap to carry out.

A further object is to enable a composite decorative metal strip or other section to be produced from a number of different metals or alloys in a single operation.

A still further object of the invention is to provide a method of making a composite decorative metal or alloy strip or other section by an extrusion technique.

With the above and other objects in view, the method of the invention broadly comprises arranging in a container in a regular predetermined manner or order, or in an irregular or indiscriminate manner, two or more distinct components, or a plurality of each of two or more distinct components of similar or dissimilar shape or outline, each component being of metallic or alloy form and each being of a metal or alloy different, and contrasting in colour, from that of the other component or components, so as to form within the container a commingled mass of the contrastingly coloured components of predetermined height, and subsequently applying pressure to the surface of said mass so as to extrude the same through a single heated die and bond the components thereof together, whereby a composite regularly or irregularly patterned metal or alloy strip or other section exhibiting contrasting colours is produced.

The metallic or alloy components employed in carrying out the invention may be of any suitable or desired form. For example, they may be in fragmentary, scrap, granular, pellet or powder form or take the form of rods, spirals or helices or of gauze. Each or all of the components may take the same form, for example, granular, rod-like or helical wire form, or one component may take the form of a plurality of rods, and the other component or components be in the form of powder. Or any other suitable combination may be employed as found desirable, it only being necessary to ensure that each component is of a different metal or alloy, and of a contrasting colour, from that of the other component or components.

The container in which the components are arranged may be the container of the extrusion press in which the extrusion step is carried out or a separate container from which the metal mass in transferred to the extrusion press container, for example, the container of a hydraulic press, in which, particularly in the case where the components are in powder form, the metal mass is compacted to form a self-sustaining handleable composite block or cylinder which is subsequently inserted in the extrusion press container.

The extrusion step is preferably carried out at such a temperature that all the components become pressure welded together during extrusion without the formation of a liquid phase.

In certain cases where surface oxidation of one or more of the component metals or alloys would interfere with the satisfactory bonding of the components during extrusion, it will be found advantageous to arrange the mass in a separate container as above described, to seal the container, for example, in an atmosphere of argon by a shielded inert gas metallic arc welding procedure, and then to place the sealed container and its contents in the container of the extrusion press and extrude the container and the metal mass therein together. In this case, the material of the container is preferably, although not necessarily, the same as that of one of the components of the metallic mass; however, any material compatible with the components of the mass to be extruded, may be used.

Any suitable combination of metals and/or alloys may be used in carrying out the invention provided the said metals and/or alloys are co-extrudable, the particular choice of materials used depending on the particular purpose for which the extruded product is intended.

The invention may obviously be carried out in a number of different ways. For example, a bi-metal strip exhibiting an irregular, variegated or mosaic pattern may be obtained by the use of two contrasting coloured components in powder or granular form, such for example, as a plurality of copper granules and a plurality of silver granules, heaped haphazardly in the container. Or, a regular patterned strip may be obtained with the use of the same components by arranging in the container successive horizontal or vertical layers of copper and silver powder, the resultant extruded strip exhibiting alternative longitudinal or transverse sections of the two metals.

Alternatively, instead of using components in the form of powders, or granules, regular patterned bi-metal or multi-layered metal strip may be obtained by the use of components both or all of which are in the form of rods, arranged horizontally in alternate layers, or vertically alternately in side by side relation.

According to a further procedure, a combination of components in the form of rods and components in the form of powder may be employed. For example, a plurality of copper rods is first arranged radially in the container. Silver powder is then introduced so as to fill the interstices between the copper rods, and also form a layer of silver powder on top of the copper rods. A second layer of copper rods is then arranged on the silver layer, followed by a further layer of silver powder. These successive steps are repeated until the mass within the container reaches the desired height.

Or, according to another procedure, one of the components may take the form of a wire spiral or helix, for example a copper spiral or helix, the spaces of interstices between the spirals or helices being filled up with a second contrastingly coloured component in powder form, such as silver powder.

If desired, a repeat pattern may be obtained by suitably serrating or etching the surface of the extruded product to expose the underlying surfaces and then rolling down to the required thickness.

To enable the invention to be fully understood and readily carried into effect, reference is now directed to the following examples, which, taken in conjunction with the accompanying diagrammatic drawings, illustrate, by way of example, various manners in which the invention may be carried out, it being clearly understood that the invention is in no way limited to, or by, these examples.

In the drawings, FIGURES 1-6 show various methods of arranging in the container the metallic mass to be extruded, FIGURES 7-12 respectively represent the product resulting from the extrusion of the masses shown in FIGURES 1-6, and FIGURES 13-18 show the patterns obtained after subsequently serrating or etching the surface and rolling down the respective product.

In each of the following examples, a container is used which, after packing, is sealed and extruded together with the metallic mass contained therein.

*Example I—FIGURE 1*

A container 1 was first packed to the required height with a plurality of concentric spirals 2 of heavy copper wire about ⅛ inch in diameter, the gap between the turns being of the order of ⅛ inch. All the interstices between the spirals were then filled with silver powder 3, the container 1 being vibrated to ensure good packing. A lid 4 was then placed on the open end of the container 1 and welded in position.

Figure 7:
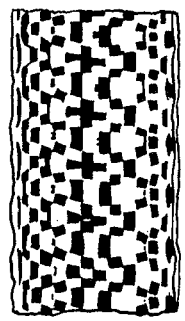
Figure 13:
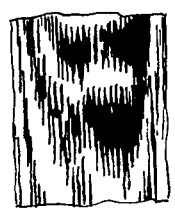

The sealed container 1 was placed in the container of an extrusion press and the container 1 together with its contents 2 and 3 was then extruded through a single suitably shaped die. The product obtained by the above procedure is illustrated in FIGURE 7, FIGURE 13 showing the result obtained after serrating the surface and rolling down to thin strip.

Figure 2:
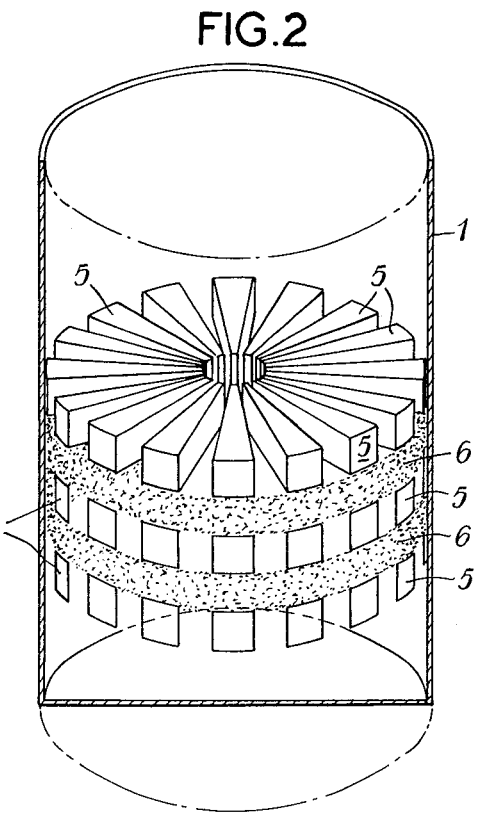

*Example II—FIGURE 2*

In the container 1 was first placed a plurality of ¼ inch square copper rods 5 disposed radially around the circumference of the container 1. Silver powder was then introduced so as to fill out the interstices between the rods 5 and to form a layer 6 of powder of about ¼ inch in thickness on top of the rods 5. Further radially disposed copper rods 5 were then arranged on top of this powder layer 6, followed by a further layer of silver powder 6. This alternative procedure was repeated until the container 1 was filled with a mass of alternate layers of copper rods and silver powder.

Figure 8:
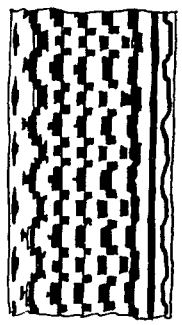
Figure 14:

The container 1 was then sealed in the manner described in Example 1, transferred to the extrusion press and the whole extruded. The product obtained by this procedure in Example 1, transferred to the extrusion press and the is illustrated in FIGURE 8, FIGURE 14 showing the result obtained after serrating the surface and rolling down to thin strip.

Figure 3:
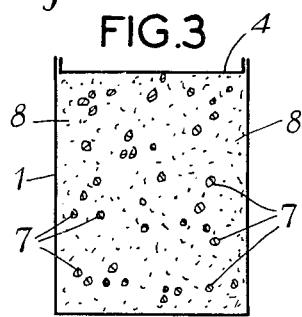

*Example III—FIGURE 3*

The container 1 was first filled with copper grains 7 and then silver powder 8 was introduced to fill out the interstices between the grains 7, the container 1 being vibrated to ensure effective packing.

Figure 9:
Figure 15:

The container 1 was then sealed as in the previous examples, and extruded through a single die to provide the product illustrated in FIGURE 9, FIGURE 15 showing the result obtained after serrating the surface and rolling down to thin strip.

Figure 4:
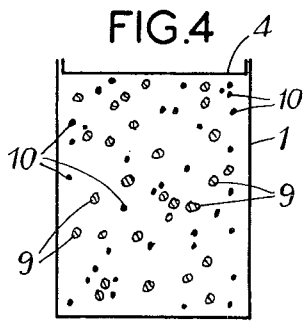

*Example IV—FIGURE 4*

This example is similar to that of Example III, except that, in this case, copper and silver grains 9 and 10 were first indiscriminately mixed together and the mixture then poured into the container 1.

Figure 10:
Figure 16:

The above described procedure was then again followed and the product obtained is illustrated in FIGURE 10, the result obtained after serrating the surface and rolling down to thin strip being shown in FIGURE 16.

Figure 5:
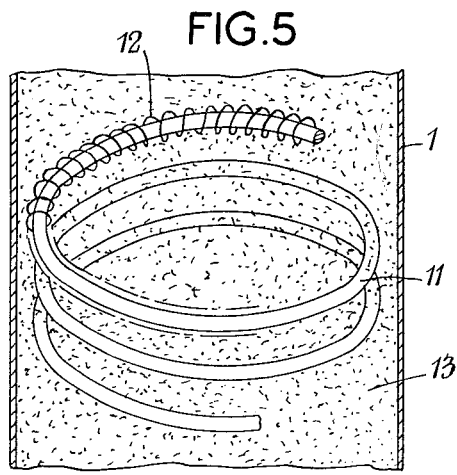

*Example V—FIGURE 5*

In this example, a plurality of helices of silver wire 11 of about ⅛ inch diameter were first enclosed or wound with smaller helices of copper wire 12 of a diameter of about 0.020 inch diameter, and placed in the container 1. The interstices between the helices 11, 12 and the remaining space in the container 1 are then filled with silver powder 13, the container 1 being vibrated as before.

Figure 11:
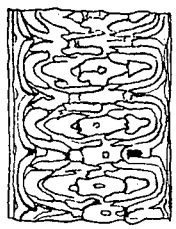
Figure 12:
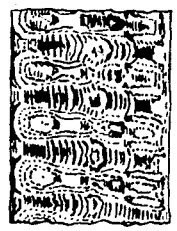
Figure 17:

After extrusion, the product illustrated in FIGURE 11 was obtained, FIGURE 17 showing the result obtained after serrating the surface and rolling down to thin strip.

Figure 6:
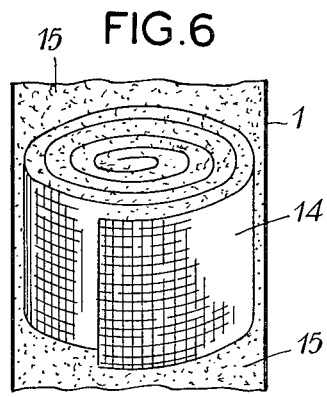

*Example VI—FIGURE 6*

Figure 18:

In this example, the extrudable mass was obtained by first introducing into the container 1 a coiled length of 40 mesh (British Standard) copper gauze 14, so as substantially to fill the container 1. The interstices were then filled with silver powder 15, the container 1 being vibrated as previously to ensure adequate packing. After sealing, the filled container was extruded and a product of the kind illustrated in FIGURE 12 was obtained. FIGURE 18 shows the effect obtained by subsequently serrating the surface of the product and rolling down to thin strip.

Although, in the above, various examples have been given of the manner in which the invention may be carried out, no limitation is intended thereby, as it will be readily appreciated that modifications may be made thereto without departing from the scope of the invention. For example, other combinations of metals than copper and silver may be used, and, where copper rods or silver gauze have been used in conjunction with silver or copper powder respectively, silver rods or copper gauze may be used in conjunction with copper or silver powder respectively, according to the appearance required in the finished extruded product.

It will also be appreciated that where, as in the above examples, the container is extruded together with the metallic mass therein, the extruded strip or rod will be covered with a thin layer or skin of the material of which the container is formed. This layer must be removed by machining or pickling so as to expose the patterned surface of the extruded mass.

As will be readily understood, there is provided by the invention a simple and efficient method of producing long-wearing decorative metal strip, rod or other section having a desired regular or an irregular pattern on one or both faces thereof, which may be readily worked as required and which is particularly suitable for use in the manufacture of a wide variety of jewellery or artistic articles.

What I claim is:

1. A method of making decorative metal or alloy strip or other section exhibiting contrasting colours on at least one face thereof, which comprises the steps of:
   (1) arranging in a metallic container at least two distinct metallic components, each of said components being comprised of metallic material different, and contrasting in colour, from at least said other component, so as to form within said container a commingled mass of said contrastingly coloured components of predetermined height,
   (2) sealing said container in an atmosphere of neutral gas with said commingled mass therein,
   (3) extruding said container and said commingled mass therein together through a single heated die to cause the components of said mass, and the material of said container, to become bonded together to form a composite patterned metallic strip or section covered by a thin layer of the material of which the container is formed and
   (4) removing said layer to expose the patterned surface.

2. A method of making decorative metal or alloy strip or other section exhibiting a pattern in constrasting colours on at least one face thereof, which comprises the steps of:
   (1) arranging in a container at least two distinct metallic components, each of said components being comprised of metallic material different, and contrasting in colour, from at least said other component, so as to form within said container a commingled mass of said contrastingly coloured components of predetermined height, at least one of said components being in the form of rods and at least another being in the form of a powder,
   (2) compacting said mass in said container to a handleable block,
   (3) removing said block from said container, and
   (4) applying pressure to the surface of said block so as to extrude the same through a single heated die and cause the components of said block to become bonded together to form a composite metallic strip or section exhibiting contrasting colours.

3. A method of making decorative metal or alloy strip or other section exhibiting a pattern in contrasting colours on at least one face thereof, which comprises the steps of:
   (1) arranging in a container at least two distinct metallic components, each of said components being comprised of metallic material different, and contrasting in colour, from at least said other component, so as to form within said container a commingled mass of said contrastingly coloured components of predetermined height, at least one of said components being in the form of coiled gauze and at least another being in the form of a powder,
   (2) compacting said mass in said container to a handleable block,
   (3) removing said block from said container, and
   (4) applying pressure to the surface of said block so as to extrude the same through a single heated die and cause the components of said block to become bonded together to form a composite metallic strip or section exhibiting contrasting colours.

4. A method of making decorative metal or alloy strip or other section exhibiting a pattern in contrasting colours on at least one face thereof, which comprises the steps of:
   (1) arranging in a container at least two distinct metallic components, each of said components being comprised of metallic material different, and contrasting in colour, from at least said other component, so as to form within said container a commingled mass of said contrastingly coloured components of predetermined height, the metal of said container being compatible with said two distinct metallic components,
   (2) extruding said container and said commingled mass therein together through a single heated die to cause the components of said mass, and the material of said container, to become bonded together to form a composite metallic strip or section, and serrating said strip or section and rolling it down to a thin strip.

5. Process as defined in claim 4 in which the layer of container metal is removed from said strip or section.

References Cited by the Examiner
UNITED STATES PATENTS

| | | | |
|---|---|---|---|
| 450,412 | 4/91 | Knight. | |
| 1,159,644 | 11/15 | Brecht | 29—411 |
| 1,563,663 | 12/25 | Seabury. | |
| 1,748,822 | 2/30 | Arsem | 29—411 |
| 2,023,498 | 12/35 | Winston. | |
| 2,362,701 | 11/44 | Koehring | 29—420.5 X |
| 2,955,222 | 10/60 | Beesch | 207—10.3 X |
| 2,986,273 | 5/61 | Bardgett | 207—10.3 |

OTHER REFERENCES

Treatise on Powder Metallurgy, Goetzel, vol. II, pages 483-487.

WHITMORE A. WILTZ, *Primary Examiner.*

JOHN F. CAMPBELL, *Examiner.*